United States Patent [19]
Chiang

[11] Patent Number: 5,476,327
[45] Date of Patent: Dec. 19, 1995

[54] BOTTOM BRACKET FOR A BICYCLE

[76] Inventor: Douglas Chiang, 2F, 903, Shiang Sin South Road, Taichung, Taiwan

[21] Appl. No.: 385,895

[22] Filed: Feb. 9, 1995

[51] Int. Cl.[6] .............................. F16C 19/50; G05G 1/14
[52] U.S. Cl. ........................................... 384/545; 74/594.1
[58] Field of Search ................................... 384/545, 512, 384/510, 540; 74/594.1

[56] References Cited

U.S. PATENT DOCUMENTS

| 4,738,551 | 4/1988 | Chi | 384/545 X |
| 5,106,210 | 4/1992 | Chi | 384/545 X |
| 5,233,885 | 8/1993 | Lin et al. | 384/545 X |

*Primary Examiner*—Thomas R. Hannon

[57] ABSTRACT

A bottom bracket for a bicycle includes an axle extending through a tube which has a first end with a first hole defined therein and a second end having a plurality of hook elements extending therefrom for engagement with a second cap at an engaging shoulder defined in the second cap, the first hole of the tube has a tapered inner periphery for engagement with a first flange having an outer tapered periphery of the axle, a first bearing is disposed between the first cap and the first end of the tube and a second bearing is disposed between the second cap and the second end of the tube, a housing threadedly engaged to an outer threaded periphery of the first and the second caps respectively such that the axle is securely engaged between the first cap, the tube and the second cap by the engagement of the hook elements and the engaging shoulder and the engagement of the first flange and the first hole of the tube.

2 Claims, 4 Drawing Sheets

5,476,327

BOTTOM BRACKET FOR A BICYCLE

BACKGROUND OF THE INVENTION

The present invention relates to a bottom bracket and more particularly, to a bottom bracket for a bicycle, which provides an excellent positioning feature for an axle thereof.

A conventional bottom bracket of a bicycle is shown in FIG. 1, which includes a housing 70, a tube 80, an axle 90, a first bearing 902 and a second bearings 903, the housing 70 having a first open end which has an inner threaded periphery defined therein and a second open end which has another inner threaded periphery defined therein, the tube 80 received in the housing 70 and having a first end with an outer threaded periphery defined therein for engagement with the inner threaded periphery of the first end of the housing 70 and a second end. A first recess 801 and a second recess 802 are respectively defined in each inner periphery of the first end and the second end of the tube 80, the axle 90 extending through the tube 80 and having a groove 91 defined in an outer periphery thereof near the second of the tube 80 for receiving the second bearing 903 between the second recess 802 of the tube 80 and the groove 91. A first cap 71 and a second cap 7 each having a central hole defined therein for the axle 90 extending therethrough are respectively engaged to the first end and the second end of the housing 70 for preventing dust from entering therein, the second cap 72 has a tubular portion 720 extending from a side thereof toward the first end of the housing 70 and disposed between the second end of the tube 80 and the second end of the housing 70, the tubular portion 720 has an outer threaded periphery 711 for engagement with the inner threaded periphery of the second end of the housing 70. The first bearing 902 is rotatably received between the first recess 801 of the tube 80 and a race 92 which is force-fitted around the axle 90. A first seal 93 and a second seal 94 are respectively engaged between the axle 90 and the tube 80 for protecting the first and the second bearings 90, 903 from dust entering therein.

However, there are only the race 92, the first and the second seals 93, 94 disposed between the axle 90 and the tube 80 such that the axle 90 tends to be loosened when the bicycle ridden over a rugged road.

The present invention provides a bottom bracket which has a tube having a first end with a hole defined therein which has an inner tapered periphery for engagement with a tapered flange extending from the axle and a second end with a plurality of hook elements for engagement with a cap so as to mitigate and/or obviate the above-mentioned problem.

SUMMARY OF THE INVENTION

The present invention provides a bottom bracket for a bicycle, which includes an axle with first and second flanges extending therefrom and extending through a tube, a first cap and a second cap are respectively disposed to each of two ends of the axle, a housing is threadedly engaged to the first and the second caps, a bearing is disposed to the axle between each end of the tube and the first and the second caps respectively, one end of the tube has a plurality of hook elements for engagement with the second cap and the other end of the tube has a hole with an inner tapered periphery of engaging with an outer tapered periphery of the first flange of the axle.

It is an object of the present invention to provide a bottom bracket having a tube with a plurality hook elements and a second cap with an engaging shoulder for securely engaged thereby.

It is another object of the present invention to provide a bottom bracket with a tube having a first hole with an inner tapered periphery and an axle having a first flange with an outer tapered periphery for securely engaged therebetween.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
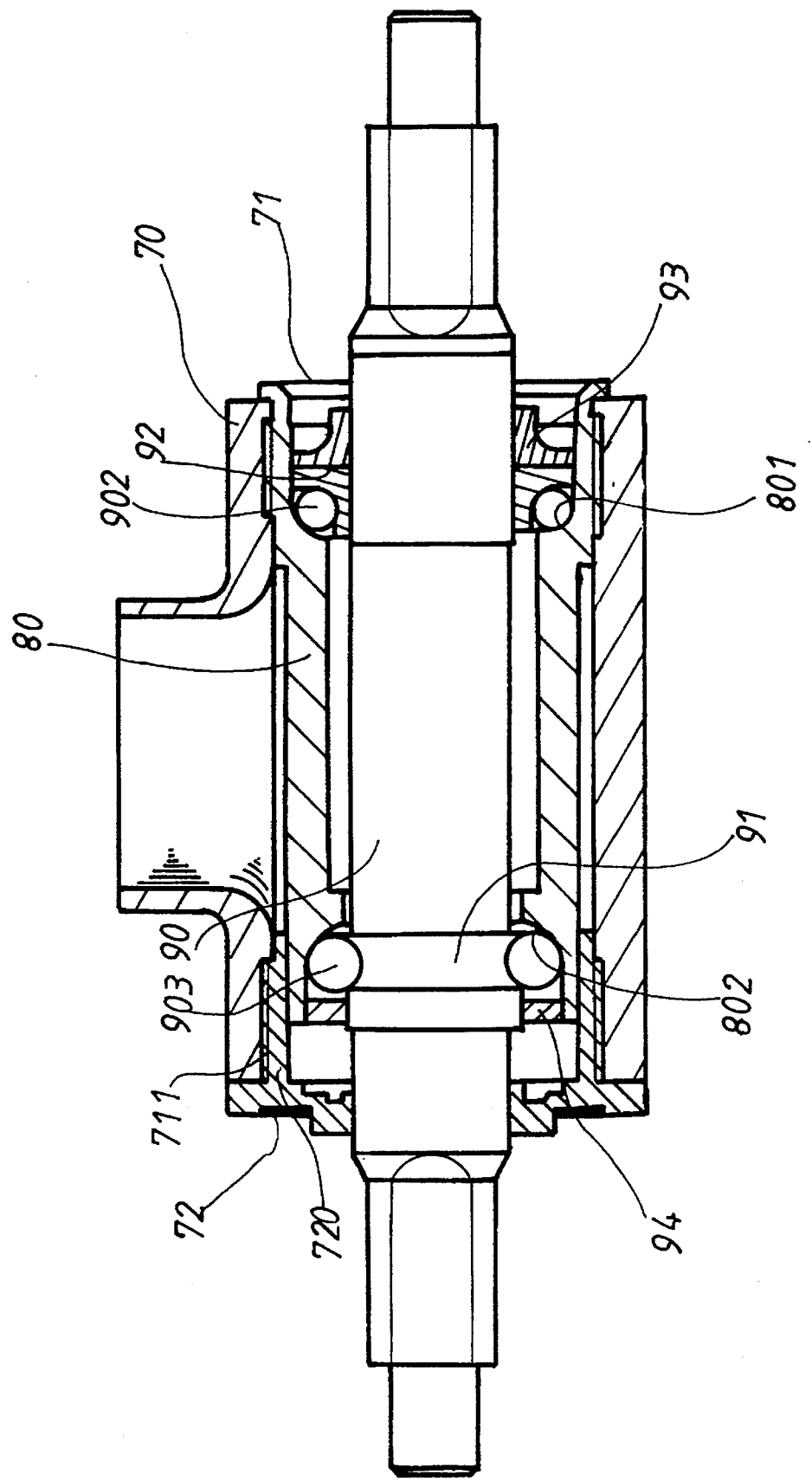
FIG. 1 is a side elevational view, partly in section, of a conventional bottom bracket.
Figure 2:
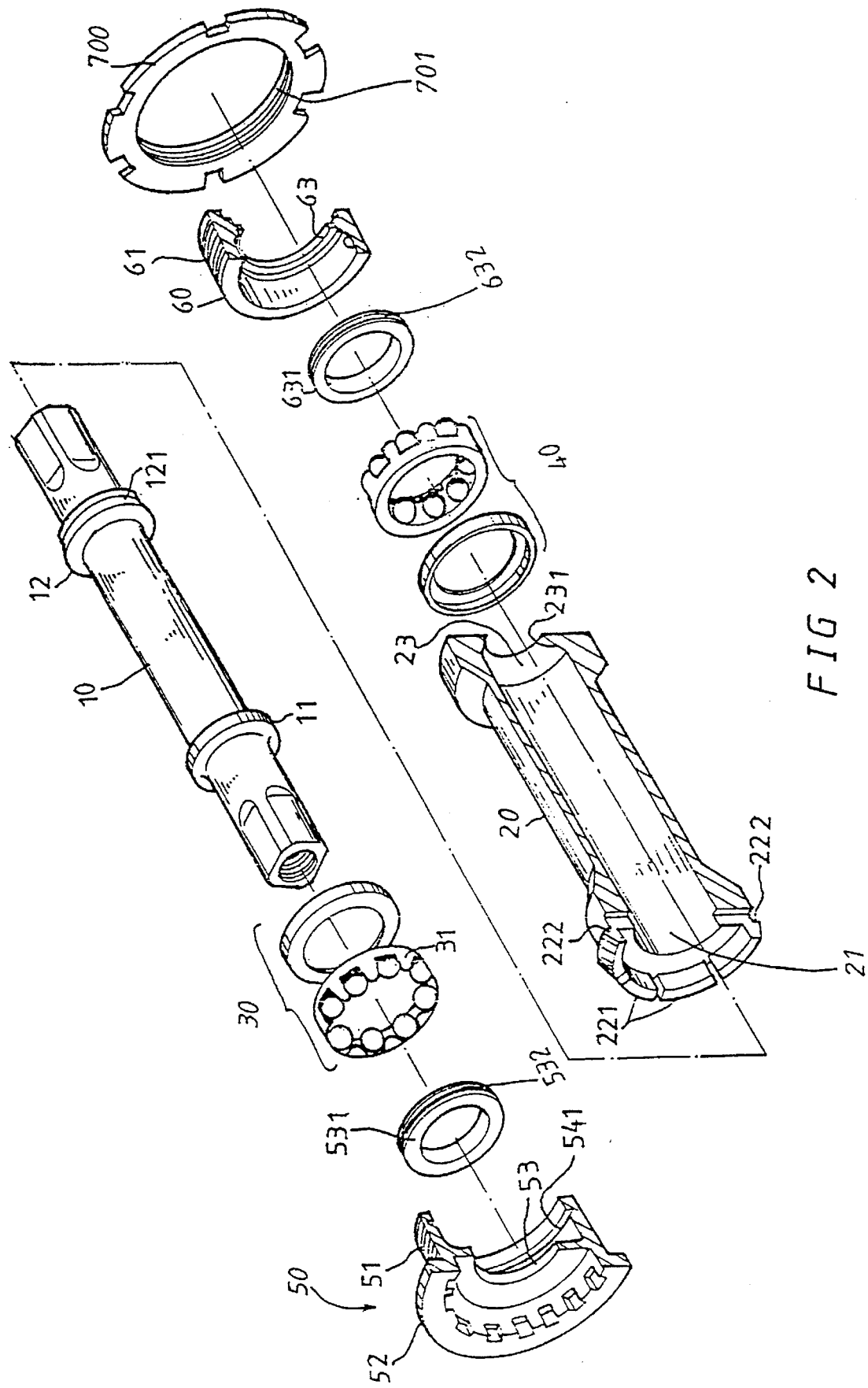
FIG. 2 is an exploded view of a bottom bracket in accordance with the present invention.
Figure 3:
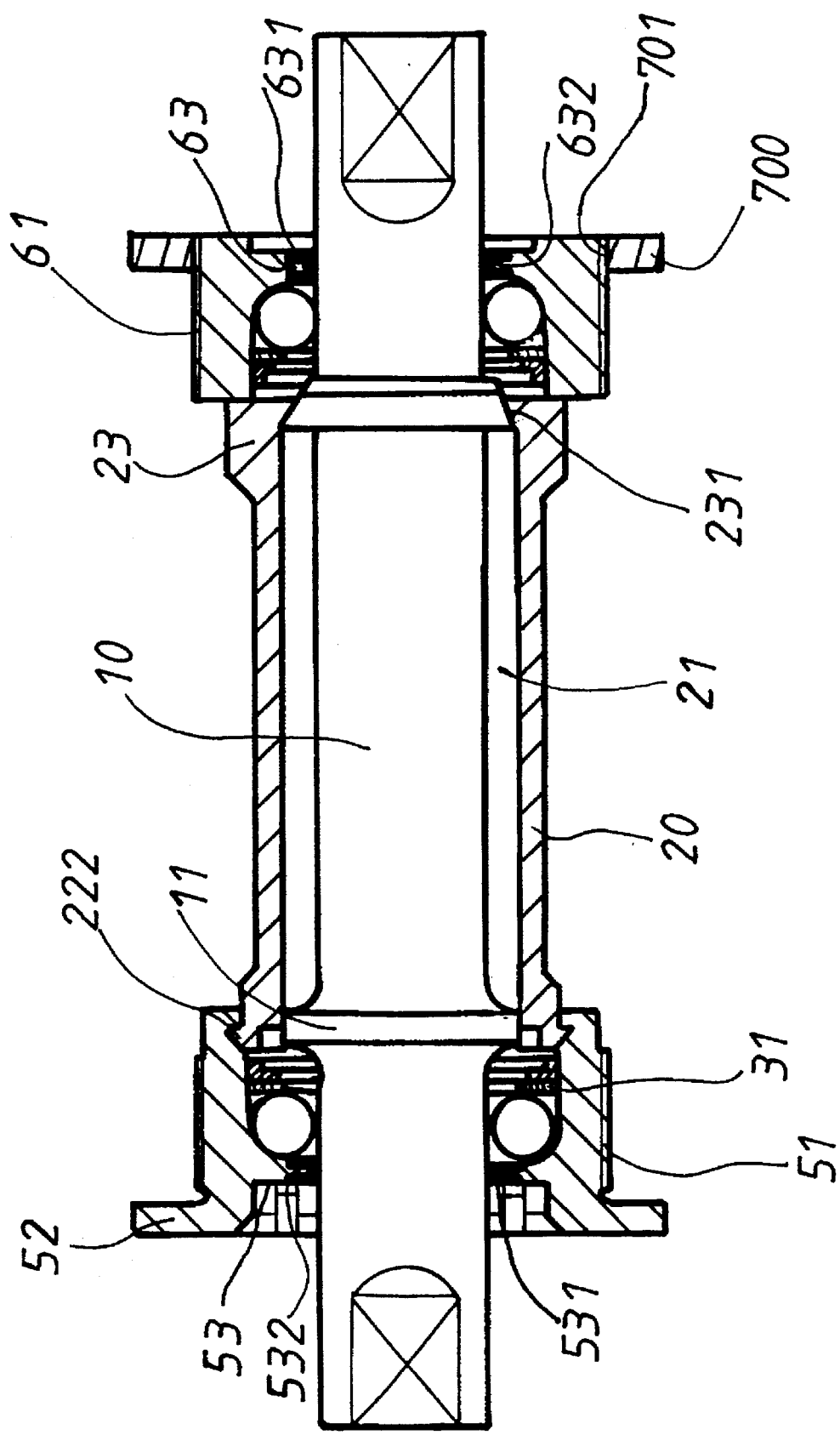
FIG. 3 is a side elevational view, partly in section, of the bottom bracket in accordance with the present invention.
Figure 4:
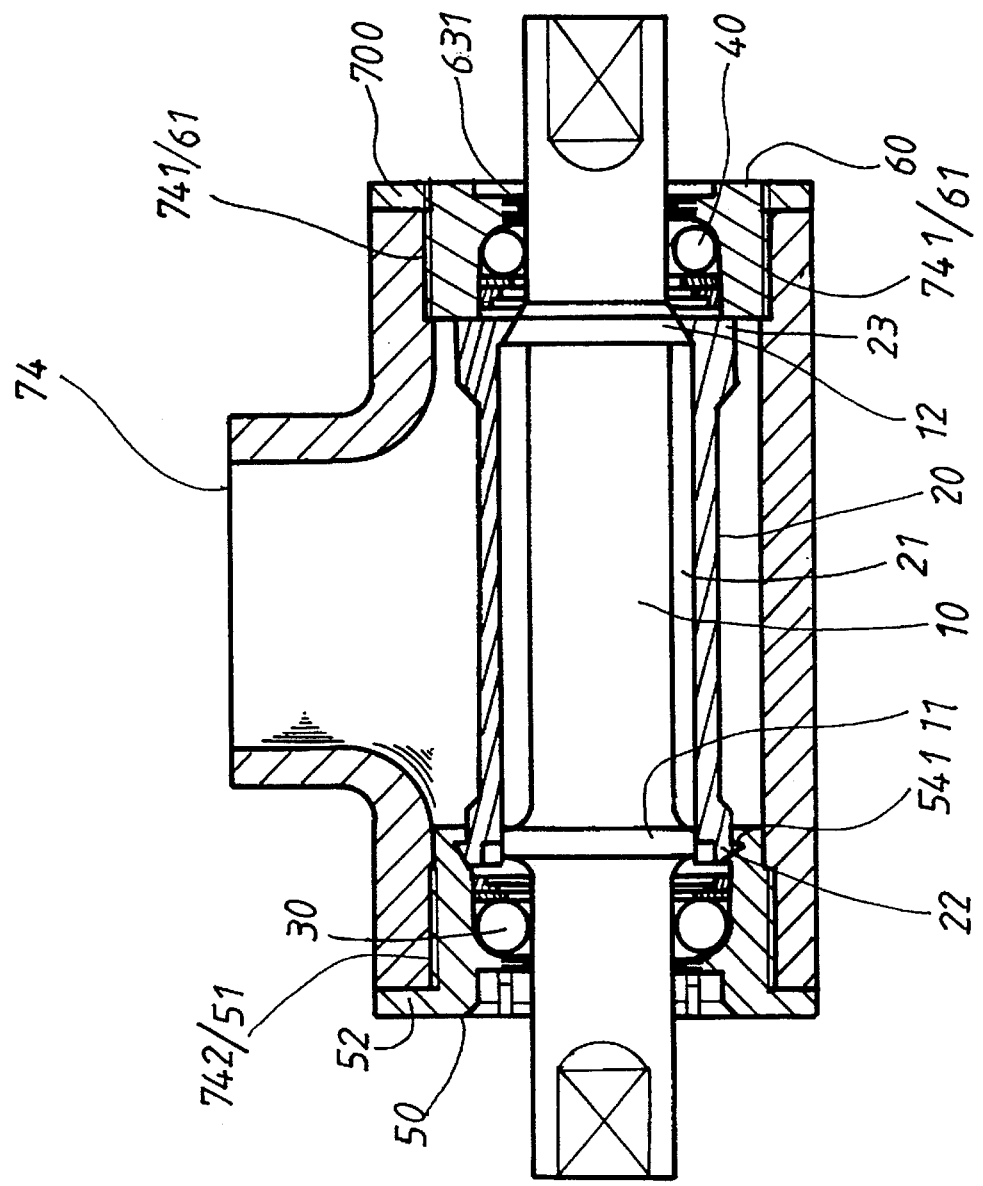
FIG. 4 is a side elevational view, partly in section, of the bottom bracket wherein a housing is threadedly engaged thereto.

Referring to FIGS. 2 through 4, a bottom bracket in accordance with the present invention generally includes a housing 74, a first cap 60, a second cap 50, a tube 20, a first bearing 40, a second bearing 30 and an axle 10. The housing 74 has a first end and a second end, the first end thereof having a first hole defined therein and having a first inner threaded periphery 741 defined therein, the second end thereof having a second hole defined therein and having a second inner threaded periphery 742 defined therein. The tube 20 has a first end and a second end, the first end thereof having a first hole 23 centrally defined therein and having an inner tapered periphery 231 defining the first hole 23, the second end thereof having a second hole 21 centrally defined therein and having a plurality of hook elements 221 extending longitudinally from the second end and each hook elements 221 having a hook portion 222. The axle 10 for extending through the tube 20 has a first end and a second end, the first end thereof having a first flange 12 extending radially therefrom which has an outer tapered periphery 121, the second end thereof having a second flange 11 extending radially therefrom, the outer tapered periphery 121 engaged to the inner tapered periphery 231 of the tube 20.

The first cap 60 is a ring-shaped element having a first outer threaded periphery 61 defined therein, a first loop flange 63 extending radially and inwardly from an inner periphery of the first cap 60 and a ring element 700 having an inner threaded periphery 701 defined therein for threadedly engaged to said first outer threaded periphery 61 of the first cap 60. The second cap 50 has a first end and a second end and has a second outer threaded periphery 51 defined in an outer periphery thereof, the second end thereof having a flange 52 extending outwardly and radially therefrom, a second loop flange 53 extending radially and inwardly from an inner periphery thereof and an engaging shoulder 541 defined in the inner periphery of the first end of the second cap 50 for engagement with the hook elements 221 of the tube 20.

When assembling, the second cap 50 is threadedly engaged to the housing 74 by the second outer threaded periphery 51 and the second inner threaded periphery 742, a second loop seal 531 having a groove 532 defined in a periphery thereof is engaged to the second loop flange 53 by receiving the second loop flange 53 in the groove 532, the second bearing 30 is disposed between the second loop flange 53 and the second end of the tube 20 through which the axle 10 extends, the axle 10 extends out from the second cap 50 and each hook portion 222 of the hook elements 221 is engaged to the engaging shoulder 541. The first flange 12 of the axle 10 is engaged to the inner tapered periphery 231 of the first hole 23 of the tube 20 and the first bearing 40 is disposed between the first end of tube 20 and the first loop cap 63 of the first cap 60 which is threadedly engaged to the first end of the housing 74 wherein a first loop seal 631 having a groove 632 defined in a periphery thereof is engaged to the first loop flange 63 similar to the engagement of the second loop seal 531 and the second loop flange 53. The ring element 700 then threadedly engaged to the first cap 60 such that the first and the second ends of the housing 74 abut against the ring element 700 and the flange 52 of the second cap 50. Therefore, the axle 10 is securely positioned by the engagement of the hook elements 221 and the engaging shoulder 541 and the engagement of the first flange 12 and the first hole 23 of the tube 20.

Although the invention has been explained in relation to its preferred embodiment, it is to be understood that many other possible modifications and variations can be made without departing from the spirit and scope of the invention as hereinafter claimed.

I claim:

1. A bottom bracket for a bicycle, and comprising:

a housing having a first end and a second end, said first end thereof having a first hole defined therein and having a first inner threaded periphery defined therein, said second end thereof having a second hole defined therein and having a second inner threaded periphery defined therein;

a tube having a first end and a second end, said first end thereof having a first hole centrally defined therein and having an inner tapered periphery defining said first hole, said second end thereof having a second hole centrally defined therein and having a plurality of hook elements extending longitudinally from said second end;

an axle for extending through said tube and having a first end and a second end, said first end thereof having a first flange extending radially therefrom, said second end thereof having a second flange extending radially therefrom and said first flange having a outer tapered periphery formed therein for engagement with said inner tapered periphery of said tube;

a first cap being a ring-shaped element and having a first outer threaded periphery defined therein and having a first loop flange extending radially and inwardly from an inner periphery thereof, a ring element having an inner threaded periphery defined therein and threadedly engaged to said first outer threaded periphery of said first cap;

a second cap having a first end and a second end and having a second outer threaded periphery defined in an outer periphery thereof, said second end thereof having a flange extending outwardly and radially therefrom, a second loop flange extending radially and inwardly from an inner periphery thereof and an engaging shoulder defined in said inner periphery of said first end of said second cap for engagement with said hook elements of said tube, and a first bearing disposed between said first loop flange and said first end of said tube, a second bearing disposed between said second loop flange and said second end of said tube and, said housing threadedly engaged to said first outer threaded periphery of said first cap and the second outer threaded periphery of said second cap.

2. The bottom bracket as claimed in claim 1 wherein said inner tapered periphery of said first hole of said tube has a increasing diameter from first end of said tube toward said second end of said tube.

\* \* \* \* \*